(12) United States Patent
Osakabe

(10) Patent No.: US 8,559,077 B2
(45) Date of Patent: Oct. 15, 2013

(54) IMAGE SCANNING DEVICE

(75) Inventor: Yoshinori Osakabe, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 385 days.

(21) Appl. No.: 12/749,957

(22) Filed: Mar. 30, 2010

(65) Prior Publication Data

US 2010/0277776 A1 Nov. 4, 2010

(30) Foreign Application Priority Data

Apr. 30, 2009 (JP) .................................. 2009-111275

(51) Int. Cl.
*H04N 1/04* (2006.01)

(52) U.S. Cl.
USPC .............................. 358/498; 358/474; 382/190

(58) Field of Classification Search
None
See application file for complete search history.

(56) References Cited

U.S. PATENT DOCUMENTS

| 7,394,575 | B2 | 7/2008 | Satake | |
|---|---|---|---|---|
| 2004/0160647 | A1 | 8/2004 | Satake | |
| 2006/0023267 | A1* | 2/2006 | Ikeno et al. | 358/474 |
| 2006/0245013 | A1 | 11/2006 | Ikeno et al. | |
| 2006/0285179 | A1* | 12/2006 | Yamada et al. | 358/497 |
| 2007/0103735 | A1 | 5/2007 | Ikeno et al. | |
| 2007/0146822 | A1* | 6/2007 | Oyama | 358/488 |
| 2007/0201105 | A1* | 8/2007 | Shoda et al. | 358/449 |
| 2007/0223062 | A1* | 9/2007 | Tanaka et al. | 358/497 |
| 2008/0297857 | A1* | 12/2008 | Ishikawa et al. | 358/498 |
| 2009/0010543 | A1* | 1/2009 | Tamai et al. | 382/190 |
| 2009/0086283 | A1* | 4/2009 | Ichinose | 358/474 |
| 2010/0165424 | A1* | 7/2010 | Maeda | 358/498 |

FOREIGN PATENT DOCUMENTS

| JP | HEI3-269784 | A | 12/1991 |
|---|---|---|---|
| JP | HEI8-167974 | A | 6/1996 |
| JP | HEI9-247371 | A | 9/1997 |
| JP | 2000-069235 | A | 3/2000 |
| JP | 2000-115455 | A | 4/2000 |
| JP | 2002-354206 | A | 12/2002 |
| JP | 2003-143373 | A | 5/2003 |
| JP | 2004-170614 | A | 6/2004 |
| JP | 2004-260642 | A | 9/2004 |
| JP | 2004-266705 | A | 9/2004 |
| JP | 2006-065289 | | 3/2006 |
| JP | 2006-311219 | | 11/2006 |
| JP | 2007-134830 | | 5/2007 |
| JP | 2009-005289 | | 1/2009 |

OTHER PUBLICATIONS

JP Office Action dtd Mar. 23, 2011, JP Appln. 2009-111275, English translation.

* cited by examiner

*Primary Examiner* — Twyler Haskins
*Assistant Examiner* — Helen Q Zong
(74) *Attorney, Agent, or Firm* — Banner & Witcoff, Ltd.

(57) ABSTRACT

A scanning device is provided with a first transparent plate on which an original sheet to is placed, the original sheet being scanned statically, a reading unit arranged below the first transparent plate and configured to scan an image on the original sheet in the main scanning direction, the reading unit being movable in an auxiliary scanning direction, and a first reference member defining a reference position for scanning an image on the original sheet, in the main scanning direction and in the auxiliary scanning direction. The first reference member is arranged at an unused area of the first transparent plate, the unused area being an area which is within the original sheet placeable area on the first transparent plate and is not covered with original sheets of a plurality of predetermined different sizes placed on the first transparent plate with being positioned with respect to a predetermined positioning point.

10 Claims, 9 Drawing Sheets

Fig. 6A
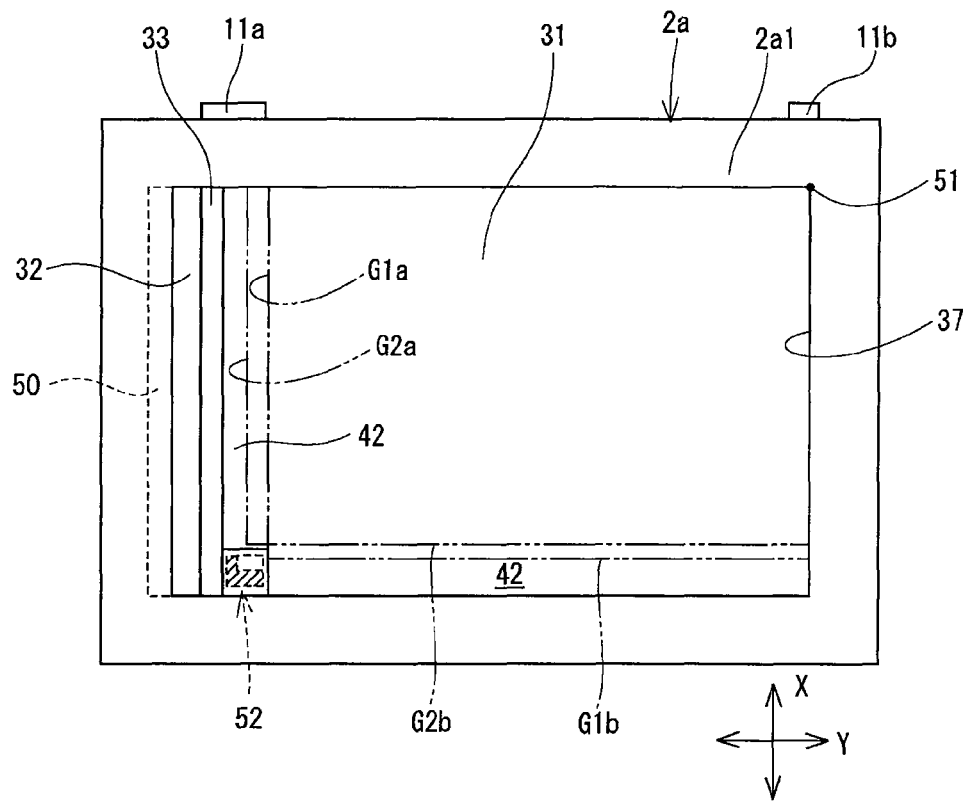
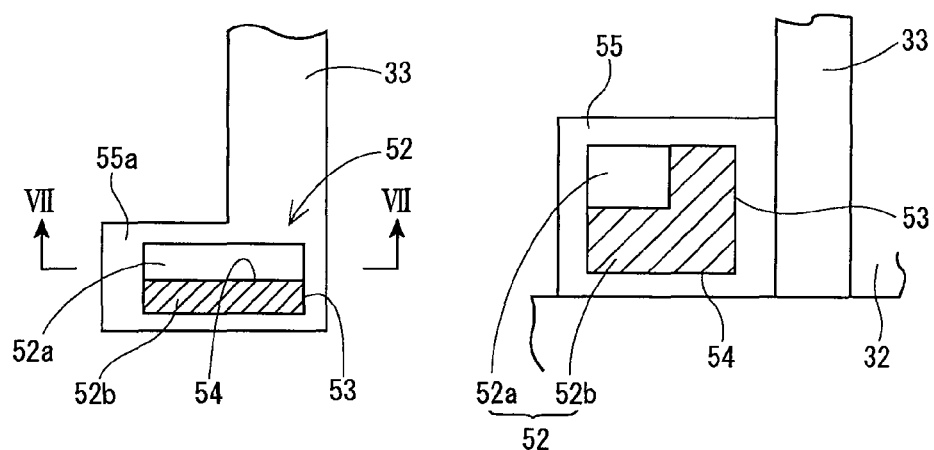
Fig. 6C    Fig. 6B

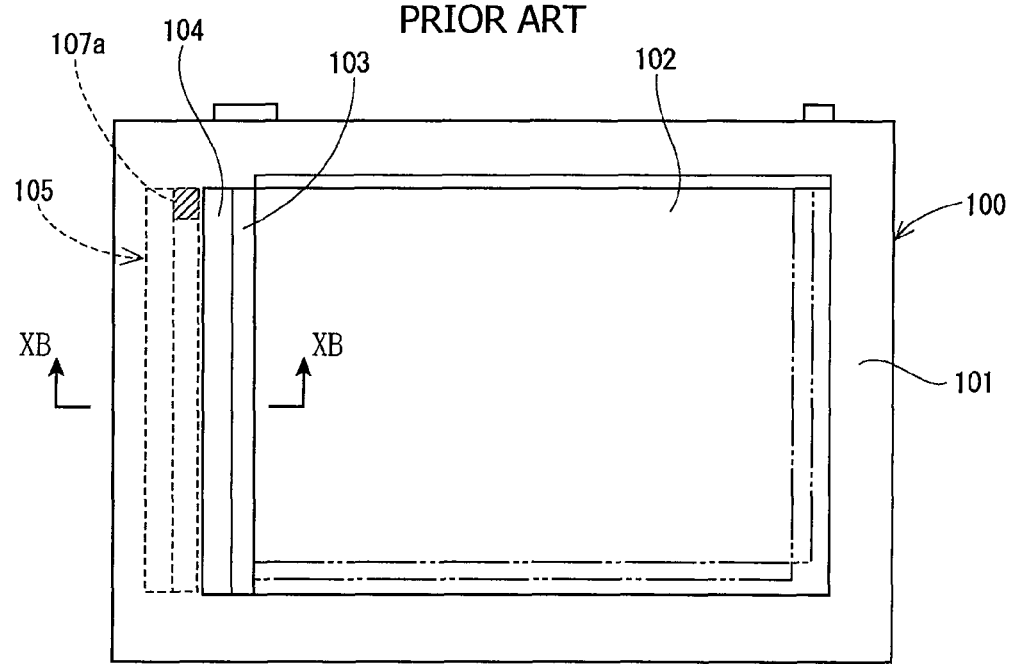
Fig. 10
PRIOR ART
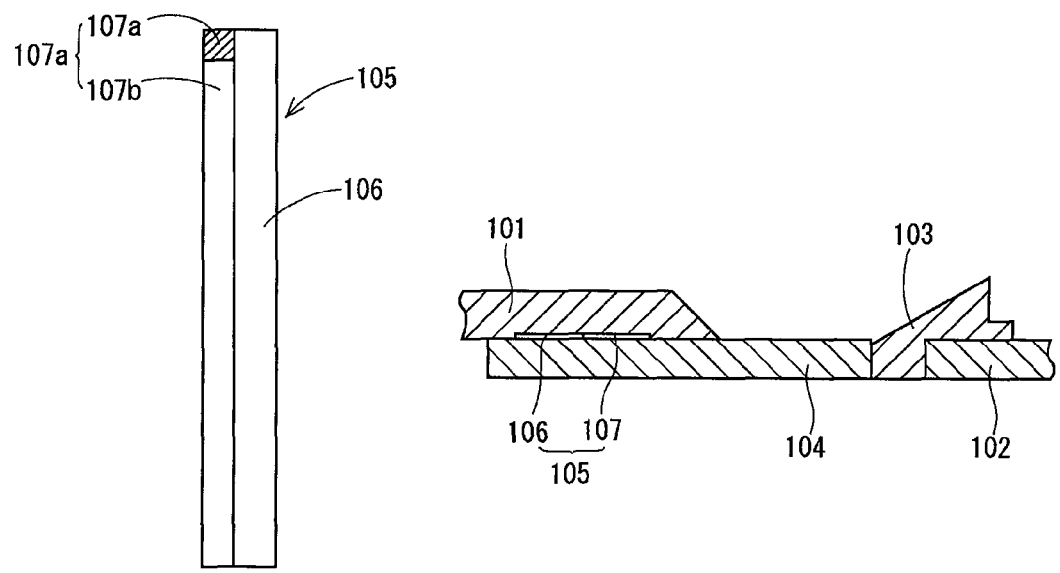
Fig. 11B
PRIOR ART
Fig. 11A
PRIOR ART

IMAGE SCANNING DEVICE

CROSS-REFERENCE TO RELATED APPLICATION

This application claims priority under 35 U.S.C. §119 from Japanese Patent Application No. 2009-111275 filed on Apr. 30, 2009. The entire subject matter of the application is incorporated herein by reference.

BACKGROUND

1. Technical Field

The following descriptions relate to an image scanning device having a reading unit, which extends in a main scanning direction and is movable in an auxiliary scanning direction, configured to move to scan an original sheet placed on a transparent plate.

2. Prior Art

An image scanner configured to scan original sheets which is being fed by a sheet feeder has been known as well as an image scanner configured to scan an original which is placed on a predetermined scanning position. The former is known as a scanner using an ADF (automatic document feeder), while the latter is known as an FBS (flat bed scanner).

The FBS is generally provided with a transparent glass plate on which an original sheet is placed and an openable/closable sheet holding cover that covers and holds the original sheet placed on the glass plate. Below the glass plate, an image scanner such as a CIS (contact image sensor) is provided. The CIS has multiple CMOS elements, optical elements including lenses, and light source such as a plurality of RGB LEDs (light emitting diodes). The multiple CMOS elements are arranged in line and light emitted by the light source and reflected by a surface of the original sheet bearing an image, and generates an electrical signal corresponding to the intensity of the received light.

The ADF is typically provided on the sheet holding cover and feeds the original sheets stacked on a sheet feed tray, which is also provided on the sheet holding cover, one by one into a sheet feed path. Typically, another (second) transparent glass plate is arranged next to one end of the transparent glass plate on which the original sheet is placed. The original sheet fed by the ADF passes over the second transparent glass plate. Below the second transparent glass plate, a scanning unit is located and scan the image on the original sheet that is fed by the ADF and passing through the second transparent glass plate. The original sheet passed over the second transparent glass plate (and image there on has been scanned), the original sheet is directed to an ejection tray by way of a scoop-up guiding member arranged next to the second transparent glass plate.

SUMMARY OF THE INVENTION

In order to compensate for unevenness of illuminating light distribution and/or unevenness of sensitivity of the image scanner, a so-called shading compensation is generally performed. That is, by illuminating a reference member having a white and black reference portions and receiving the reflected light, parameters to be used to compensate for the scanned image are obtained. In addition, with use of a boundary between the white reference part and black reference part, a reference scanning position of a linear image sensor is determined.

In such a conventional scanner, an area of a large glass plate is divided into the first transparent area having the first transparent area relatively large area, and the second transparent area which is a relatively small area. Further a positioning member to which an end of the original sheet is abut for accurately positioning the original sheet on the first transparent glass plate. The positioning member also serves as a member which partitions the first transparent glass plate and the second transparent glass plate. Further, the positioning member may be formed to scoop up the original sheet, which is fed by the ADF and passed over the second transparent glass plate at which the image there is scanned, and guides the thus fed original sheet to a sheet ejection section. Such a positioning member generally extends in the main scanning direction and is typically secured on the large glass plate with, for example, a both-sided adhesive tape. Therefore, the reference member having the black and white areas is arranged between the positioning member and the glass plate.

In such a configuration, in view of downsizing of the image scanner, the positioning member described above may be configured as small as possible. Therefore, the size of the reference member, particularly in the auxiliary scanning direction, should be made as small as possible. As a result, the length of the boundary of the white area and the black area in the auxiliary scanning direction becomes very small. When such a boundary is scanned by the image scanner, a positioning error may likely be occur relatively easily. In another configuration, the first transparent glass plate and the second transparent glass plate are made as different member and the scoop-up guide member (i.e., the positioning member) is placed between the first and second transparent glass plates, and the reference member is adhered on the bottom surface of the scoop-up guide member. According to the latter configuration, the similar problem occurs.

FIG. 10 shows a configuration of a part of an example of such a conventional image scanner. Specifically, FIG. 10 shows a case 100 of the image scanner provided with the first glass plate 102 and the second glass plate 104 which are arranged in an opening formed on the upper plate 101 of the case 100 with the scoop-up guide member 103 therebetween.

As shown in FIGS. 10 and 11A, on the bottom surface of the upper plate 101 at a portion opposite to the scoop-up guide member 103 with respect to the second glass plate 104, the reference member 105 is provided. The reference member 105 has an elongated rectangular shape extending in the main scanning direction, and having length slightly longer than a scanning range of the image scanner. The reference member 105 is divided, in the auxiliary scanning direction, into two areas: a white reference portion 106, and a main scanning position reference portion 107. The white reference portion 106 is formed such that the entire area thereof is white with an even density. The main scanning position reference portion 107 is configured such that an end portion, in the main scanning direction, is formed to be a black area 107a, and the remaining portion is a white area 107b, the black area 107a and the white area 107b being arranged next to each other in the main scanning direction. With used of the reference member 105, a scanning reference point (a scanning origin point) in the main scanning direction and the auxiliary scanning direction can be defined.

However, according to the conventional configuration shown in FIGS. 10, 11A and 11B, the reference member 105 is arranged at an end portion of the casing 100. Therefore, the scanning unit should be moved to the position below the reference member 105. For this purpose, the case 100 should be made to have a sufficient size in order to allow the scanning unit to move below the reference member 105. Therefore, the conventional structure prevents downsizing of the case 100.

In consideration of the above problem, according to aspects of the invention, there is provided a scanning device configured to scan images formed on original sheets, which is provided with an original sheet placing case provided with a first transparent plate on which an original sheet to is placed, the original sheet being scanned statically, a reading unit arranged below the first transparent plate and configured to scan an image on the original sheet in the main scanning direction, the reading unit being movable in an auxiliary scanning direction, and a first reference member defining a reference position for scanning an image on the original sheet, in the main scanning direction and in the auxiliary scanning direction. The first reference member is arranged at an unused area of the first transparent plate, the unused area being an area which is within the original sheet placeable area on the first transparent plate and is not covered with original sheets of a plurality of predetermined different sizes placed on the first transparent plate with being positioned with respect to a predetermined positioning point.

According to aspects of the invention, there is also provided a scanning device configured to scan images formed on original sheets, which includes an original sheet placing case provided with a first transparent plate on which an original sheet to is placed, the original sheet being scanned statically, a scanning unit configured to scan an image on the original sheet placed on the first transparent plate in the main scanning direction, the scanning unit being movable in an auxiliary scanning direction, an automatic sheet feeder configured to automatically feed the original sheets to be scanned in a predetermined direction, a fed sheet scanning section at which the original sheet fed by the automatic sheet feeder is scanned, the fed sheet scanning section being provided with a second transparent plate over which the original sheet fed by the automatic sheet passes, the second scanning unit being configured to stay below the second transparent plate, and a framing member provided between the first transparent plate and the second transparent plate, a side, extending in the main scanning direction, of the original sheet placed on the first transparent plate abutting the framing member. An intersection of one side extending in the main scanning direction and another side extending in the auxiliary scanning direction of the original sheet plaseable area defines a positioning point at which a corner of the original sheet is located for positioning, and the first reference member is arranged on a part of the lower surface of the framing member at a position farthest, in the main scanning direction, from the positioning point.

BRIEF DESCRIPTION OF THE ACCOMPANYING DRAWINGS

FIG. 6A is a plan view of a sheet-feed scanning unit and a non-feed scanning unit according to the second embodiment.

FIG. 6B is an enlarged view of a part of the sheet-feed and non-feed scanning units shown in FIG. 6A, viewed from the inside of the MFP according to the second embodiment.

FIG. 6C is an enlarged view of a part of the sheet-feed scanning unit and the non-feed scanning unit shown in FIG. 6A.

FIG. 10 is a plan view of a sheet-feed scanning unit and a non-feed scanning unit of a conventional MFP.

FIG. 11A is an enlarged partial side view taken along line XB-XB in FIG. 10.

FIG. 11B is a bottom view of a reference member of an MFP according to a conventional art.

DETAILED DESCRIPTION OF THE EMBODIMENT

Hereinafter, referring to the accompanying drawings, embodiments according to aspects of the invention will be described.

In the following description, an MFP 1 having integrally incorporated facsimile machine, image scanning device, copying device and image forming device will be described.

Figure 1:
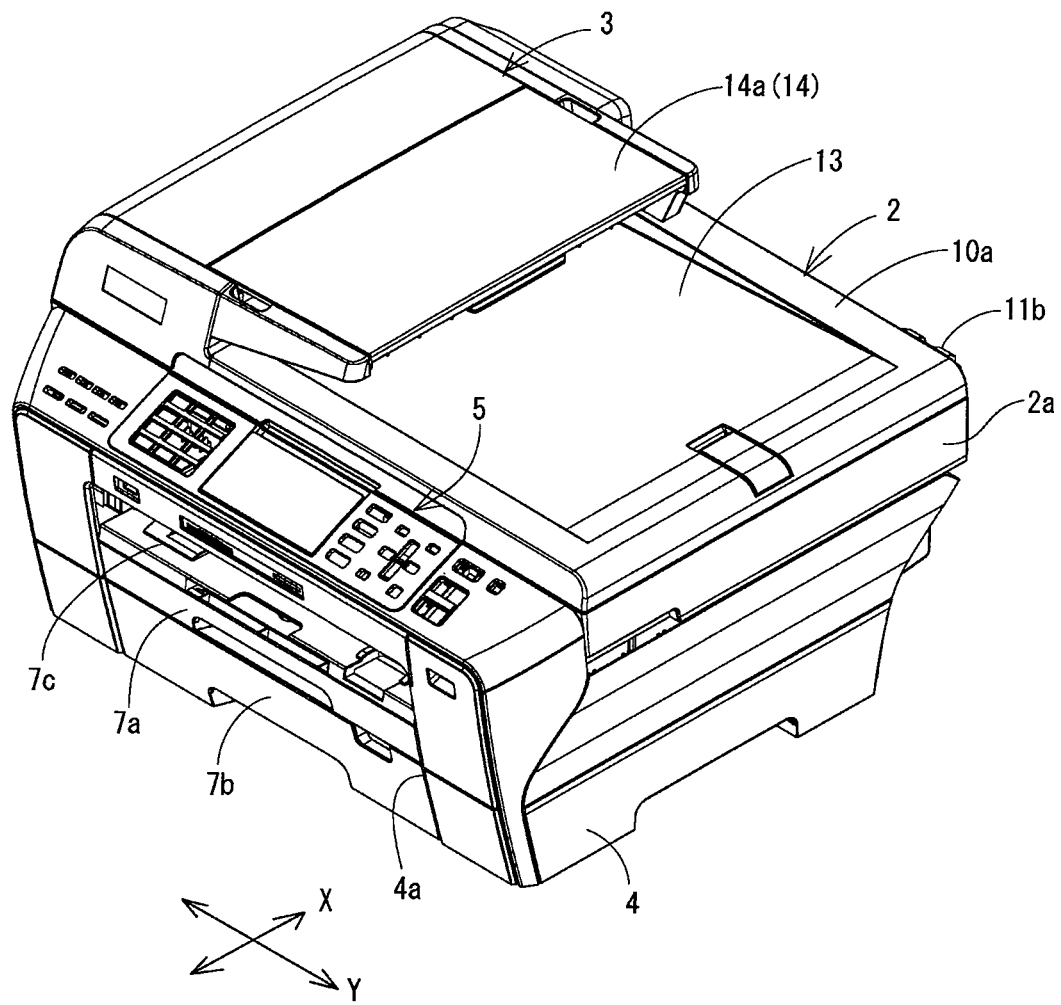
FIG. 1 is a perspective view of an MFP (multi-function peripheral) having an ADF (auto document feeder) function and an image scanner function, according to an exemplary embodiment of the invention.

As shown in FIG. 1, on an upper surface of the MFP 1, at a front end portion (which is a left-hand side portion along arrow X in FIG. 1), an operation panel unit 5 is provided. The operation panel unit 5 is provided with a ten key buttons and other operation buttons which are used for selecting a function of the facsimile machine unit, scanner unit, copier unit and inputting various operational commands, etc. Further, the operation panel unit 5 is also provided with an LCD (liquid crystal display) panel, which is used for displaying indications corresponding to input commands and/or various messages such as an error messages.

On a front sided surface of a housing 4 of the MFP 1, an opening 4a is formed, and sheet feed cassettes 7a and 7b are detachably inserted in the MFP 1 through the opening 4a. Each of the sheet feed cassettes 7a and 7b is formed such that the topside is opened and a plurality of sheets are accommodated therein in a stacked state. The sheet feed cassettes 7a and 7b can be removed from/inserted in the MFP 1 along the X direction (see arrows indicated in FIG. 1) through the opening 4a. The sheet feed cassettes 7a and 7b have a two-tiered structure, i.e., they are arranged in the up and down direction as shown in FIG. 1. Above the sheet feed cassette 7a, a sheet ejection tray 7c is provided. The sheets selectively fed from the sheet feed cassettes 7a and 7b are processed (e.g., an image is printed with the image forming device such as an inkjet head inside the housing 4) and ejected from the MFP 1 onto the sheet ejection tray 7c.

Figure 2:
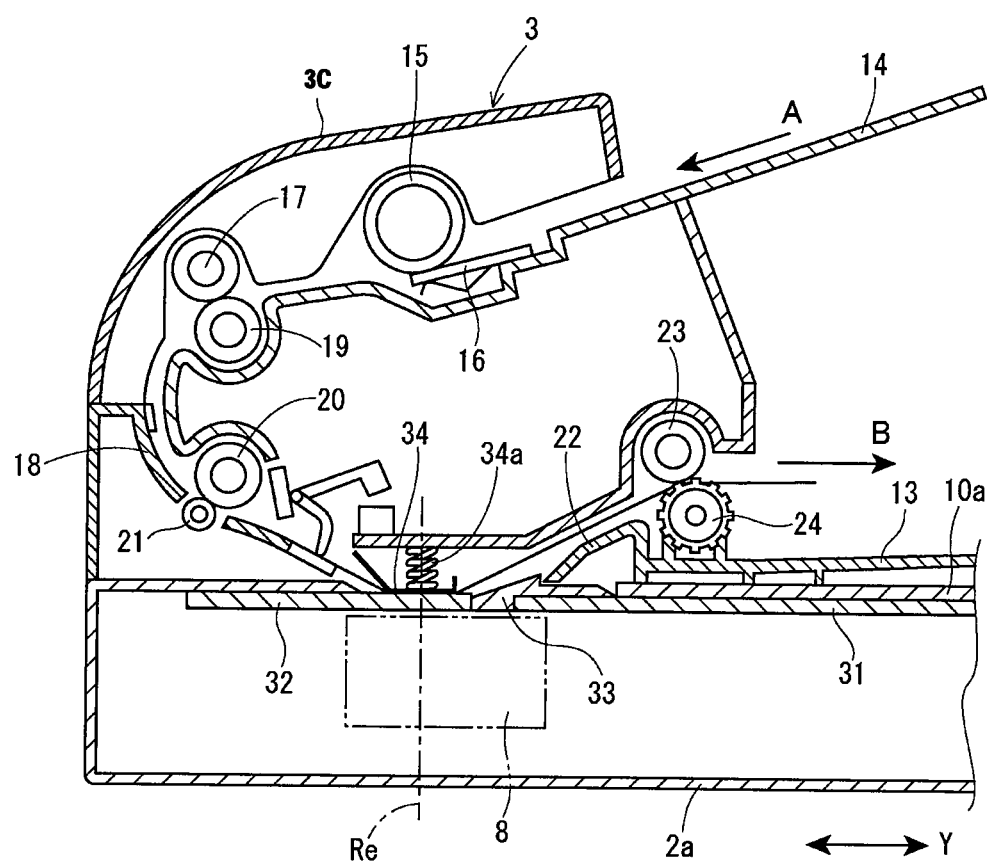
FIG. 2 is cross-sectional partial side view of the MFP shown in FIG. 1.
Figure 3:
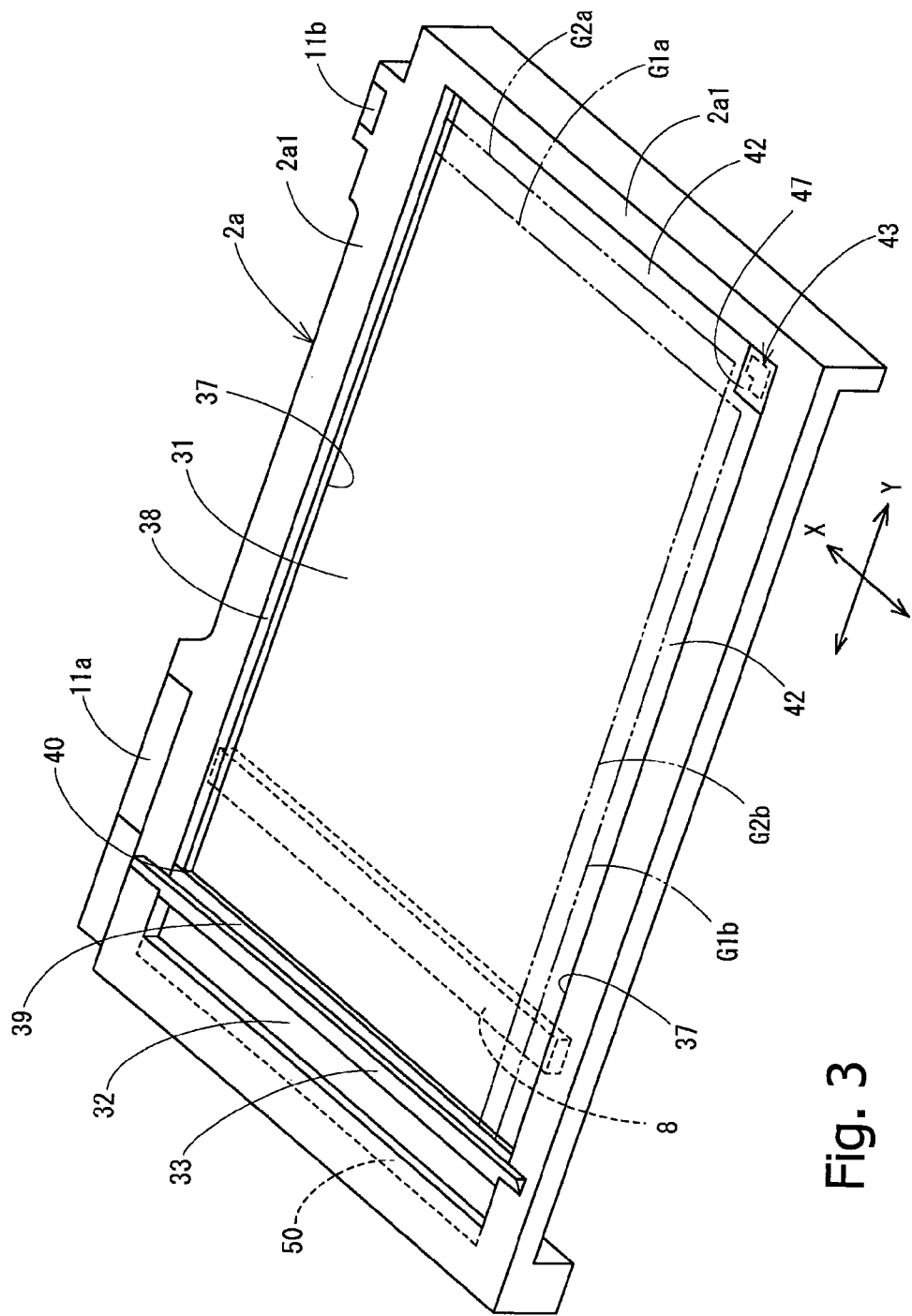
FIG. 3 is a perspective view showing a sheet-feed scanning unit and a non-feed scanning unit according to a first embodiment.

On a rear side (i.e., a right-hand side along arrow X in FIG. 1) of the operation panel unit 5, a scanner unit 2a and an ADF (automatic document feeder) 3 are provided (see FIG. 1). As shown in FIGS. 2 and 3, on an upper surface of a scanner unit 2a, which also serves as an original mounting case thereof, there are provided a first transparent plate 31 on which an original sheet is to be placed for the non-feed scanning and a second transparent plate 32 on which the original sheet fed by the ADF 3 slide-contacts for feed-scanning are arranged next to each other with a scoop-guide member 33 interposed therebetween. In the exemplary embodiments, the transparent plates 31 and 32 are both made of transparent glass.

The scanner unit 2a is hinged on the rear side of the MFP 1 to the housing 4 such that the scanner unit 2a is swingable about an axis which extends horizontally (i.e., in a direction of arrow Y in FIGS. 1, 2 and 3).

The ADF 3 that feeds the original sheets relative to the image scanning device 2 includes a cover body 10, an ejection tray section 13 defined on the upper surface of the cover body 10, and a sheet feed tray section 14 defined above the ejection tray 13.

The sheet feed tray section 14 includes a foldable supporting member 14a, which is extended to hold the downstream end portion of the original sheets placed on the sheet feed tray section 14. When folded (as shown in FIG. 1), the supporting member 14a serves as a cover of the sheet feed tray section 14. When the original sheets are relatively large in size, the supporting member 14a is extended and the downstream side portion of the original sheets are placed on the extended supporting member 14a. On a lower surface of the cover body 10, a pressure plate 10a is secured as shown in FIG. 2. The pressure plate 10a presses the original sheet placed on the first transparent plate 31 so that the original sheet securely contacts the first transparent plate 31.

The cover body 10 is made of synthetic resin and secured to the scanner unit 2a with a pair of hinges 11a and 11b (see FIG. 3) provided at its rear end (i.e., an end opposite to the end where the operation panel 5 is provided). With the above structure, the cover body 10 is slidable upward/downward and openable/closeable (swingable) with respect to the scanner unit 2a. The reason why the pair of hinges 11a and 11b are movable upward/downward is to maintain the cove body 10 to be parallel with the first transparent plate 31 even if a relatively thick original such as a book is placed on the first transparent plate 31.

In the ADF 3, a U-shaped sheet feed path 18 is defined to have a first path extending in a first direction (arrow A in FIG. 2) and directing the original sheet to a scanning position Re which is located at one side end (along Y-direction) of the sheet feed tray section 14, and a second path extending in a second direction (arrow B in FIG. 2) and directing the original sheet from the scanning position Re to the ejection tray section 13.

The sheet feed tray section 14 is provided with a pair of original guide members. The pair of original sheet guide members are for guiding the original sheet along Y-direction and configured such that one of the original guide member is manually moved in X-direction (see FIG. 1), the other of the pair of the original guide members is moved by a well-known association mechanism, thereby the distance between the pair of original guide members in X-direction being adjusted to meet the width of the original sheets placed on the sheet feed section 14.

The ADF 3 is provided with a sheet separation unit which separates one sheet from among a plurality of original sheets stacked on the sheet feed tray section 14 and feeds the separated sheet in a first direction, which is a direction where the sheet approaches the scanning position Re. The separation unit includes a separation roller 15 and a separation pad 16.

On the downstream side of the separation unit and above the sheet feed path 18, a sending roller unit including a first pinch roller 17 and a first driving roller 19 is provided. On the upstream side of the scanning position Re and at a lower end portion of the sheet feed path 18, a second driving roller 20 and a second pinch roller 21 are arranged. On the downstream side of the scanning position Re and at an upper end portion (i.e., a downstream side end portion) of the ejection path 22, an ejection roller unit including a third driving roller 23 and a third pinch roller 24 is provided. A driving force of an ADF motor (not shown) is transmitted to the separation roller 15, the first driving roller 19, the second driving roller 20, and the third driving roller 23 through a geared transmission mechanism (not shown), which is accommodated below a cover 3C which covers the left portion (in FIG. 2) of the ADF 3.

A linear-shaped reading unit 8 for scanning an image formed on the original sheet is mounted on a guide members (not shown) extending in Y-axis direction (see FIGS. 3 and 4), which direction will also be referred to as an auxiliary scanning direction. The reading unit 8 has an elongated shape extending in X-direction, which will also be referred to as a main scanning direction, together with the guide member, is configured to reciprocate in Y-axis direction.

As shown in FIGS. 2 and 3, the left-hand side portion of the first transparent plate 31 is defined as the second transparent plate 32 with an elongated scoop-up guide member 33 adhered on the first transparent plate 31. In the embodiment, the first transparent plate 31 and the second transparent plate 32 are configured with a transparent glass plate having a planar and smooth up/down surfaces which are parallel with each other. However, it is only an exemplary configuration and the first transparent plate 31 and the second transparent plate 32 may be configured with a transparent synthetic resin plate.

When scanning is performed with use of the ADF 3, the original sheet is fed such that the original sheet slide-contacts the upper surface of the second transparent plate 32 with a surface bearing an image facing the second transparent plate 32, and the reading unit 8 staying below the second transparent plate 32 scans the image at a portion of the original sheet contacting the second transparent plate 32. Therefore, a position above the reading unit 8 located at the scanning position is the scanning position Re for the original sheet fed by the ADF (see FIG. 2). According to the embodiment, in order to ensure that the original sheet slide-contacts the upper surface of the second transparent plate 32, a sheet press member 34 is provided, which is urged downward with a spring 34a (see FIG. 2).

Although not shown, the reading unit 8 is provided with a carriage which is slidably mounted on guide members having a cylindrical shaft shape, with its attitude being fixed. A topside of the carriage is opened and a case is accommodated in the carriage. Inside the carriage, an image scanning sensor is secured. According to the exemplary embodiment, a CIS (contact image sensor) is used as the image sensor. The case is configured to movable in up and down direction and swingable with respect to the carriage.

The carriage is connected to a belt (not shown) which is wound around a driving pulley and driven pulley respectively arrange at both end portions, in Y-direction, in the scanner unit 2a. By actuating a driving motor to rotate the driving pulley, the carriage, and thus, the reading unit 8 can be reciprocated in the auxiliary scanning direction.

First Embodiment

Figure 4A:
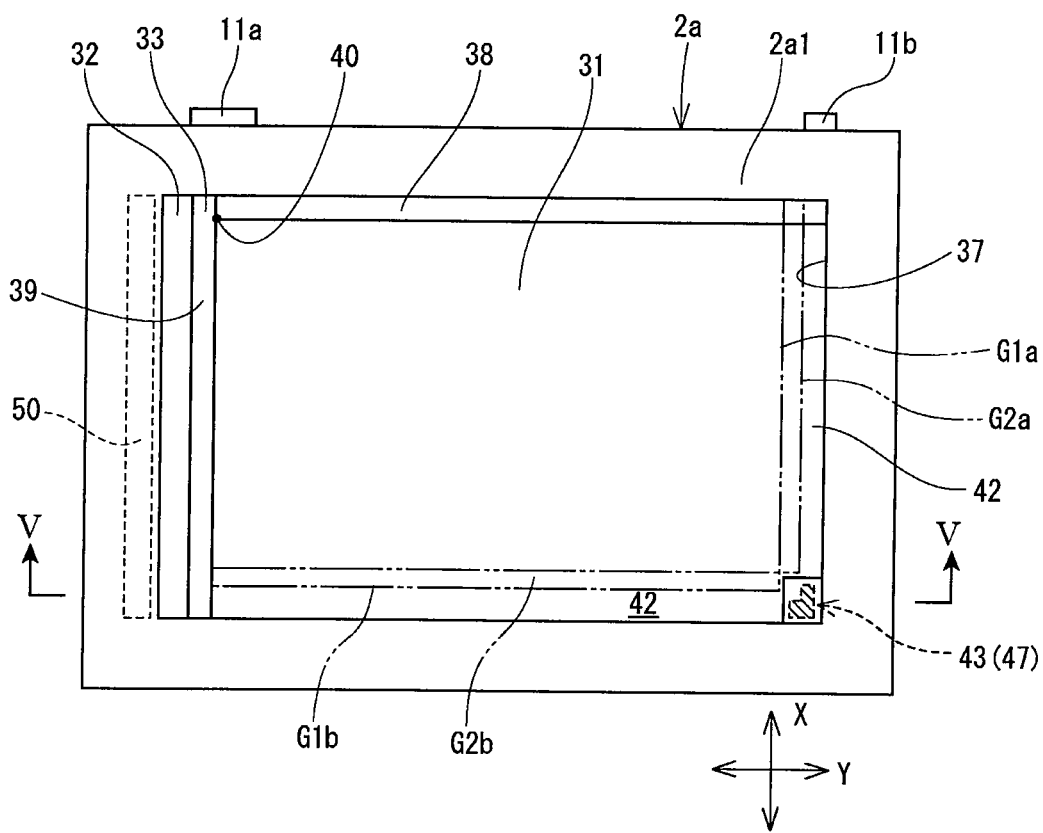
FIG. 4A is a plan view of the sheet-feed scanning unit and the non-feed scanning unit according to the first embodiment.
Figure 4B:
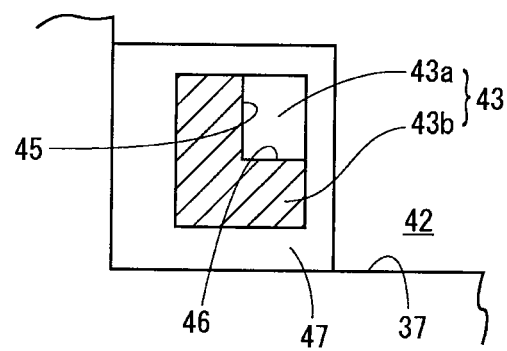
FIG. 4B is an enlarged view of a part of the sheet-feed and non-feed scanning units shown in FIG. 4A, viewed from the inside of the MFP according to the first embodiment.

Positioning of the original sheet on the first transparent plate 31 will be described. According to a first embodiment, as shown in FIG. 3 and FIG. 4A, the first transparent plate 31, the scoop-up guide member 33 and the second transparent plate 32 are arranged next to each other as if a rectangular opening 37 formed on the upper plate 2a1 of the scanner unit 2a is covered therewith, from the right-hand side to the left-hand side when viewed from the above. Specifically, the first transparent plate 31, the scoop-up guide member 33 and the second transparent plate 32 are fitted in between two horizontal sides, which extend parallel with the auxiliary scanning direction (i.e., in Y-direction), of the opening 37 and supported thereby. The entire area of the first transparent plate 31, which area has a rectangular shape, exposed from the opening 37 serves as an area on which the original sheet is placed for scanning. According to the first embodiment, the area of the first transparent plate 31 on which the original sheet is placed is determined such that the largest original sheet usable in the MFP can be placed thereon. Specifically, according to the first embodiment, there are two types of the maximum sheet sizes, which are A3 size (297 mm×420 mm) and Leger size (279.4 mm×431.8 mm). The latter is also known as a tabloid size (11"×17").

On one of the horizontal sides and on one vertical side extending along the scoop-up guide member 33, a first framing member 38 and a second framing member 39 are secured, respectively, such that the first framing member 38 and the second framing member 39 are arranged perpendicularly to each other in a plan view thereof. In the embodiment shown in FIG. 3 and FIG. 4A, the first framing member 38 is secured to the horizontal side close to the hinges 11a and 11b.

The second framing member 39 is formed integrally with the scoop-up guide member 33. Alternatively, the second framing member 39 may be arranged next to the scoop-up guide member 33. In this embodiment, an intersecting point of the first and second framing members 38 and 39 (i.e., a corner of the opening 37) is defined as a reference point 40 at which one of the corners of the original sheet is located when placed on the first transparent plate 31. On the surface of the first and second framing members 38 and 39, gradations may be indicated by engraving or printing to enable recognition of the size of the original sheet in case the size of the original sheet is different (smaller) than the above-indicated sizes (e.g., A4, A5, B4, B5, etc.). It is noted that the first framing member 38 may be integrally formed with the upper plate 2a1 of the scanner unit 2a.

According to the first embodiment, a first reference member 43 is provided at a position outside an area where the original sheet G1 of the A3 size and the Leger size G2 are placed on the first transparent plate 31 (i.e., a potion of the transparent plate 31 on which the original sheets G1 and G2 are not located) with its corner being located at the reference point 40, and at a corner opposite to the reference point 40, as shown in FIG. 3 and FIG. 4A. It is noted that, in FIG. 3 and FIG. 4A, two perpendicularly intersecting sides of the A3 original sheet G1 and farther from the reference point 40 are indicated by references G1a (a side extending in the main scanning direction) and G1b (a side extending in the auxiliary scanning direction). Similarly, two perpendicularly intersecting sides of the Leger-size original sheet G1 and farther from the reference point 40 are indicated by references G2a (a side extending in the main scanning direction) and G2b (a side extending in the auxiliary scanning direction).

Thus, the first reference member 43 is arranged at a corner opposite to the reference point 40 on the first transparent plate 31. The position where the first reference member 43 is arranged is outside the sides G1a and G2a, and outside the sides G1b and G2b, and inside the inner sides of the opening 37 (which area will be also referred to as an unused area).

Figure 5:
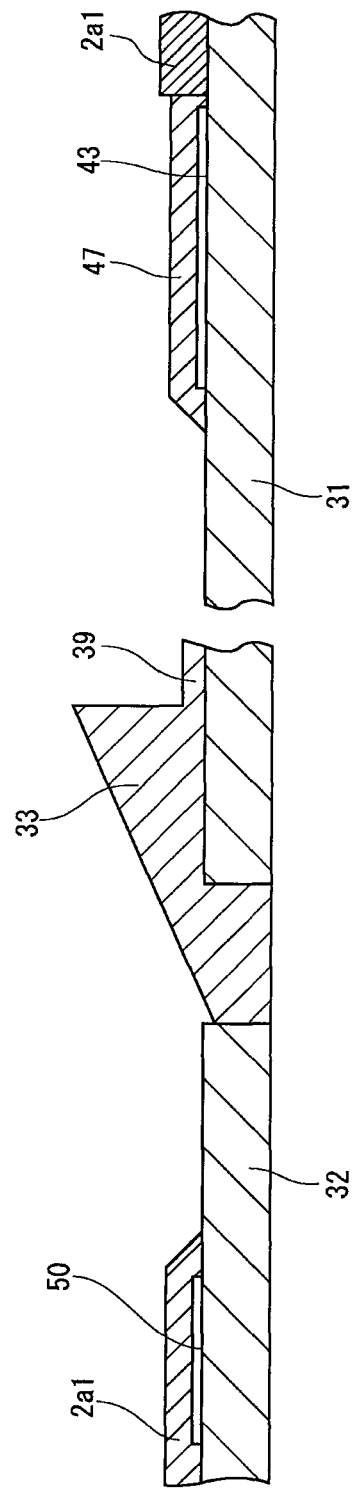
FIG. 5 is an enlarged cross-sectional view of the sheet-feed and non-feed scanning units shown in FIG. 4A, taken along line V-V of FIG. 4A.

The first reference member 43 is for determining a reference point for scanning in the main scanning direction and the auxiliary scanning direction for the original sheets of various sizes. Specifically, the first reference member 43 has a white area 43a, a black area 43b and reference lines 45 and 46 which are boundary lines between the white area 43a and the black area 43b, the reference lines 45 and 46 extending in the main scanning direction and auxiliary scanning direction, respectively (see FIG. 4B). The first reference member 43b is arranged on the first transparent plate 31 such that the white area 43a and the black area 43b face downward (i.e., face the reading unit 8). The first reference member 43 is secured onto the first transparent plate 31 with the back surface (i.e., upper surface) thereof being covered with a cover member 47 (see FIG. 5). The first reference member 43 may be formed with black and white tapes which are combined to realize the above configuration. Alternatively, the first reference member 43 may be formed by overlaying a black tape onto a white tape having a relatively large area. The first reference member 43 may be fixed onto the first transparent plate 31 with use of a both-sided adhesive tape, for example. Alternatively, by forming the black tape to have an L-shaped plan view and the outer two perpendicular outlines of the L-shape may be used as the reference lines 45 and 46. Further alternatively, instead of the white and black tapes, different color tapes which enable recognition of the boundary lines (i.e., the reference lines) 45 and 46 may be combined to form the first reference member 43.

According to the above configuration, as the reading unit 8, which moves along the auxiliary scanning direction, reads the reference line 45, the origin point of scanning in the main scanning direction can be determined. Similarly, as the reading unit 8 reads the reference line 46, the origin point in the auxiliary scanning direction can be determined. After the origin points for scanning have been obtained, it becomes possible to judge presence/absence of the original sheet and a position of the original sheet, which could have one of various sizes.

A second reference member 50 is arranged at a position opposite to the scoop-up guide member 33 with respect to the scanning position Re on the second transparent plate 32. The second reference member 50 is, for example, a tape of which the lower surface is white. Specifically, the second reference member 50 is fixed, with use of a double-sided adhesive tape or the like, at a position sandwiched between the upper surface of the second transparent plate 32 and the lower surface of the upper plate 2a1 of the scanner unit 2a (see FIG. 5).

The second reference member 50 is used also for so-called shading compensation. Generally, the image sensor of the reading unit 8 has uneven distribution of intensity of light source in the main scanning direction and/or uneven sensitivity characteristics of the light receiving elements in the main scanning direction. Therefore, according to the embodiment, light intensity distribution in the main scanning direction is adjusted with use of the second reference member 50, and then by scanning the illuminated second reference member 50 with use of the reading unit 8 to obtain white level data. For this purpose, the length in the main scanning direction of the second reference member 50 is slightly longer than the length of the image sensor of the reading unit 8. A standby position of the reading unit 8 is below the second reference member 50.

As described above, the first reference member 43 is arranged:

(1) inside the area in the first transparent plate 31 where the original sheet can be placed (i.e., within an opening area);

(2) in an area 42 which is outside the areas where the original sheets having G1 size and G2 size (i.e., maximum sizes among a plurality of possible sizes) can be placed; and (3) at the corner which is an opposite position of the reference point 40 at which a corner of the original sheet is to be located.

With the characteristic (1) above, the movable range of the reading unit 8 in the auxiliary scanning direction can be retained within the area in the first transparent plate 31 where the original sheet is placed. Therefore, in comparison with a case where the reading unit 8 is moved outside the area where the original sheet is placed, the size of the scanner unit 2a can be made small, which enables downsizing of the entire device. Further, reading of the first reference member 43 can be performed quickly.

With the characteristic (2) above, it becomes possible to perform reading of the first reference member 43 with the reading unit 8 with keeping the original sheets having the maximum sizes (G1 and G2) placed on the first transparent plate 31.

With the characteristic (3) above, the shape and area of the first reference member 43 can be made relatively large since the area 42 is relatively large. Therefore, the reference line 45 extending in the main scanning direction and the reference line 46 extending in the auxiliary scanning direction, which lines are boundaries of the white area 43a and the black area 43b, can be made relatively long. Accordingly, accuracy in scanning the original sheet can be improved.

Hereinafter, second through fourth embodiments and modifications will be described. In the following description, components similar to those of the first embodiment are referred to by the same reference numbers.

Second Embodiment

FIGS. 6A and 6B shows a first reference member 52, which is for determining a reference position in the main scanning direction and the auxiliary scanning direction for the original sheets of various sizes, according to a second embodiment. According to the second embodiment, the scanner unit 2a also has a first transparent plate 31 and the second transparent plate 32. A reference point 51 at which the corner of the original sheet having the maximum size (G1 or G2) is located is a corner which is within an area of the first transparent plate 31 where the original sheet can be placed (i.e., within the opening 37) and one of the corners on the farthest side from the second transparent plate 32. The first reference member 52 is located at a corner, on the first transparent plate 31, which is within the area 42 where the original sheets of the A3 size (G1) and the Leger size (G2) are not located when one corner of the original sheets G1 and G2 is located at the reference point 51, and at a corner opposite to the reference point 51. Specifically, the reference member 52 is located on a side closer to the scoop-up guide member 33 extending in the main scanning direction, within an unused area 42 of the first transparent plate 31. According to this arrangement, a portion, within the unused area 42 where no original sheet is placed, extending in the main scanning direction is adjacent to the scoop-up guide member 33 (see FIG. 6A). According to the second embodiment, it is preferable that gradations indicating the size of the original sheets and a framing member to which a side of the original sheet is abut are provided on the upper plate 2a1 of the scanner unit 2a which, together with the transparent plate 31, sandwiches the reference point 51.

The first reference member 52 according to the second embodiment is configured similarly to that of the first embodiment. Namely, as shown in FIG. 6B, the first reference member 52 includes a white area 52a and a black area 52b, and a reference line 53 which is a boundary between the white area 52a and the black area 52b extending in the main scanning direction, and a reference line 53 which is a boundary line between the white area 52a and the black area 52b extending in the auxiliary scanning direction. The first reference member 52 is secured on the first transparent plate 31 such that the white area 52a and the black area 52b face the first transparent plate 31 (and the reading unit 8) and the back surface (upper surface) of the first reference member 52 is covered with a cover member 55 (see FIG. 6A).

It should be noted that the first reference member 52 may be configured with black and white tapes which form the configuration described above. Alternatively, the first reference member 52 may be configured by overlapping a black tape having a smaller area on a white tape having a larger area. The first reference member 52 may be secured to the first transparent plate 31 with use of double-side adhesive tape. Further alternatively, the first reference member 52 may be configured with a black tape having an L-shape plan view. In such a case, the outer sides of the L-shape which perpendicularly intersect may be used as the reference lines 53 and 54.

According to the second embodiment, the similar effect as in the first embodiment is obtained. In addition, since the first reference member 52 is located closer to the second transparent plate 32 (i.e., the standby position of the reading unit 8), reading of the first reference member 52 can be performed quickly.

FIG. 6C shows a modification of the second embodiment. According to this modification, the cover 55a is formed integrally with a portion of the scoop-up guide member 33 and the first reference member 52 is arranged below the bottom surface of the cover 55a and a portion of the scoop-up guide member 33 (see FIG. 7). With this configuration, an area required for the first reference member 52 can be enlarged in comparison with a case where the first reference member is arranged only within the unused area 42, where the original sheet can be placed, of the first transparent plate 31.

Third Embodiment

Figure 8:
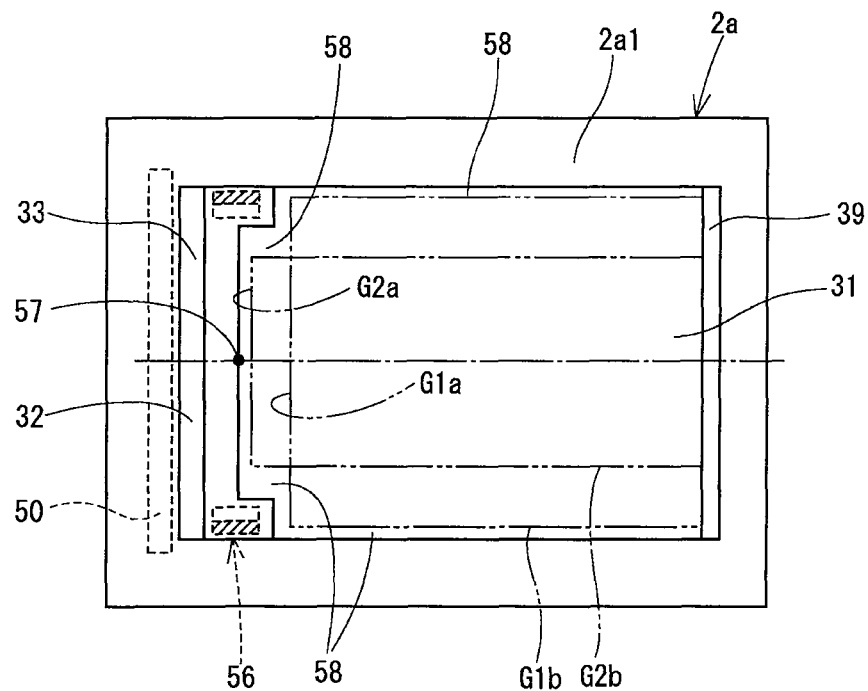
FIG. 8 is a plan view of a sheet-feed scanning unit and a non-feed scanning unit according to a third embodiment.

FIG. 8 shows a first reference member 56 according to a third embodiment. Similar to the first and second embodiment, the scanning unit 2a has a first transparent plate 31 and the second transparent plate 32. According to the third embodiment, a reference point 57 to which a center of a side, which extends in the main scanning direction, of the maximum size original sheet (G1 or G2) is positioned is indicated. The reference point 57 is located within the area of the first transparent plate 31 where the original sheet can be placed (i.e., within the opening), and at the center of the first transparent plate 31 in the main scanning direction. In this case, the original sheet having each of the various sizes is to be placed such that the center of the side extending the main scanning direction is positioned at the reference point 57 (which positioning is referred to as a center positioning).

When the center of the side, in the main scanning direction, of the A3 original sheet G1 or the Leger size original sheet G2 is positioned at the reference point 57, a unused area 58 having two first rectangular areas farthest from the reference point in the main scanning direction and extending in the auxiliary scanning direction along the horizontal sides of the opening 37 and a second rectangular area extending in the main scanning direction along the vertical side of the opening 37 is formed. A first reference member 56 is arranged at each of the intersections of the first rectangular areas and the second rectangular area (i.e., the first reference members 56 are arranged at two different positions).

Figure 7:
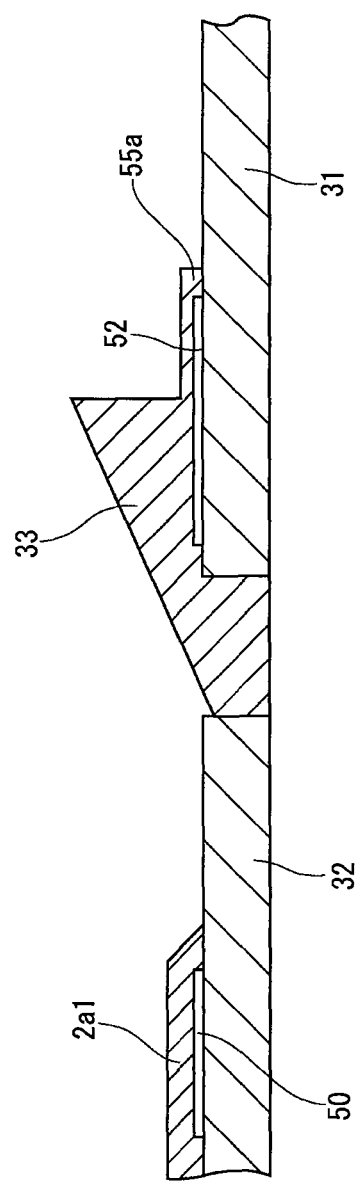
FIG. 7 is a cross-sectional enlarged view taken along line VII-VII in FIG. 6C.

Specifically, according to the third embodiment, the cover 55a is integrally formed with a portion of the scoop-up guide member 33 and the first reference member 56 is arranged below the bottom surface of the cover 55a and the part of the scoop-up guide member 33, similarly to the modification of the second embodiment (see FIGS. 6C and 7). With this configuration, an area required for the first reference member 56 can be enlarged in comparison with a case where the first reference member is arranged only within the unused area, where the original sheet can be placed, of the first transparent plate 31.

According to the third embodiment configured as above, even if the first reference members 56 are arranged within the unused area on the first transparent plate 31, since the first reference members 56 are arranged at two positions, reading accuracy of the reference positions is improved.

Fourth Embodiment

Figure 9:
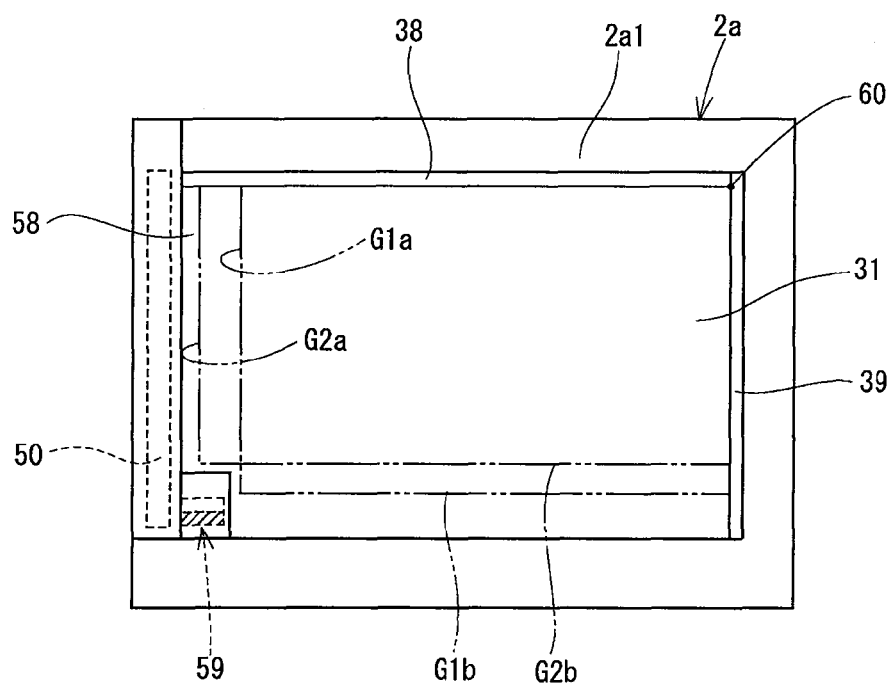
FIG. 9 is a plan view of a sheet-feed scanning unit and a non-feed scanning unit according to a fourth embodiment.

According to a fourth embodiment shown in FIG. 9, the scanner unit 2a has only the first transparent plate 31 and ADF is not provided. A reference point 60 to which the corner of the original sheets of various sizes (G1, G2) is located within the original placeable area (in the opening) and at an intersection of one horizontal side extending along the auxiliary scanning direction and one vertical side extending along the main scanning direction of the rectangular opening 37 which is formed on the upper plate 2a1 of the scanner unit 2.

The first reference member 59 is arranged at a corner which is opposite to and farthest from the reference point 60, within the original placeable area of the first transparent plate 31 and within an unused area 42 which is outside the original placeable area for the maximum size original sheets (G1, G2).

Specifically, the corner is located outside the sides G1a and G2a of the maximum size original sheets G1 and G2, outside the sides G1b and G2b of the maximum size original sheets G1 and G2, and within the opening.

Although not shown in FIG. 9, the first reference member 59 has white and black areas and reference lines which are boundaries of the black and white areas and extend in the main and auxiliary scanning directions, respectively. The first reference member 59 is arranged on the first transparent plate 31 such that the black and white areas face the first transparent plate 31, and the back surface (i.e., the upper surface) thereof is covered with a cover member, as in the first through third embodiments.

As modification of the fourth embodiment, although not shown, the reference point for central positioning may be provided within the placeable area of the first transparent plate 31 (in the opening) and at a central position in the main scanning direction. Further, similar to the third embodiment, two first reference members may be arranged at two intersections of the two rectangular areas extending in the auxiliary scanning direction and one rectangular area extending in the main scanning direction. Such a configuration is similar to that of the third embodiment, and similar effects are obtained.

As further modifications, in each of the above-described embodiments and modifications, the second reference member 50 may be fixed by sandwiching the same between the upper surface of the first transparent plate 31 and the bottom surface of the scoop-up guide member 33.

What is claimed is:

1. A scanning device configured to scan images formed on original sheets, comprising:
   a transparent plate that comprises an original sheet placeable area;
   a reading unit arranged below the transparent plate and configured to scan an image on the original sheet placed on the original sheet placeable area in a main scanning direction, the reading unit being movable in an auxiliary scanning direction perpendicular to the main scanning direction;
   a reference member defining a reference position for scanning an image on the original sheet in the main scanning direction and in the auxiliary scanning direction, wherein the reference member is located at a first corner within the original sheet placeable area; and
   a predetermined positioning point located at a second corner within the original sheet placeable area which is diagonal to the first corner.

2. The scanning device according to claim 1, wherein the reference member is arranged at an unused area of the original sheet placeable area, and is not covered with original sheets of a plurality of predetermined different sizes placed on the original sheet placeable area and positioned with respect to the predetermined positioning point.

3. The scanning device according to claim 2, wherein the original sheet placeable area has a rectangular shape.

4. The scanning device according to claim 2, wherein the original sheet placeable area has a rectangular shape, and wherein the predetermined positioning point, at which the center of a side in the main scanning direction of the original sheet is located for positioning, is provided with a center of one side, which extends in the main scanning direction.

5. The scanning device according to claim 4, wherein the reference member is provided at positions, within the unused area, apart from the predetermined positioning point.

6. A scanning device configured to scan images formed on original sheets, comprising:
   an original sheet placing case formed with an opening;
   a transparent plate that comprises an original sheet placeable area, the transparent plate being exposed from the opening;
   a reading unit arranged below the transparent plate and configured to scan an image on the original sheet placed on the original sheet placeable area in a main scanning direction, the reading unit being movable in an auxiliary scanning direction perpendicular to the main scanning direction; and
   a reference member defining a reference position for scanning an image on the original sheet in the main scanning direction and in the auxiliary scanning direction, wherein the reference member is arranged at a predetermined area within an inner side of the opening and at a first corner within the original sheet placeable area; and
   a predetermined positioning point located at a second corner within the original sheet placeable area which is diagonal to the first corner.

7. The scanning device according to claim 6, wherein the reference member is arranged at an unused area of the original sheet placeable area, and is not covered with original sheets of a plurality of predetermined different sizes placed on the original sheet placeable area and positioned with respect to the predetermined positioning point.

8. The scanning device according to claim 7, wherein the original sheet placeable area has a rectangular shape.

9. The scanning device according to claim 7, wherein the original sheet placeable area has a rectangular shape, and wherein the predetermined positioning point, at which the center of a side in the main scanning direction of the original sheet is located for positioning, is provided with a center of one side, which extends in the main scanning direction.

10. The scanning device according to claim 9, wherein the reference member is provided at positions, within the unused area, apart from the predetermined positioning point.

* * * * *